(12) United States Patent
Katsuhara (10) Patent No.: US 11,232,559 B2
(45) Date of Patent: Jan. 25, 2022

(54) IMAGE PROCESSING APPARATUS AND COMPUTER-READABLE STORAGE MEDIUM

(71) Applicant: Konica Minolta, Inc., Tokyo (JP)

(72) Inventor: Shinsuke Katsuhara, Kodaira (JP)

(73) Assignee: KONICA MINOLTA, INC., Tokyo (JP)

(*) Notice: Subject to any disclaimer, the term of this patent is extended or adjusted under 35 U.S.C. 154(b) by 53 days.

(21) Appl. No.: 16/657,692

(22) Filed: Oct. 18, 2019

(65) Prior Publication Data
US 2020/0160514 A1 May 21, 2020

(30) Foreign Application Priority Data
Nov. 16, 2018 (JP) .............................. JP2018-215181

(51) Int. Cl.
*G06T 7/00* (2017.01)

(52) U.S. Cl.
CPC .. *G06T 7/0012* (2013.01); *G06T 2207/10116* (2013.01); *G06T 2207/30008* (2013.01); *G06T 2207/30061* (2013.01); *G06T 2207/30092* (2013.01); *G06T 2207/30168* (2013.01)

(58) Field of Classification Search
CPC . G06T 2207/10116; G06T 2207/30008; G06T 2207/30061; G06T 2207/30092; G06T 2207/30168; G06T 7/0012; G06T 7/0002; G06T 7/00; G06T 7/20; G06T 7/215; G06T 7/246; G06T 2207/10; G06T 2207/00; G06T 2207/30004; G06T 2207/30; G06T 2207/30101
See application file for complete search history.

(56) References Cited

U.S. PATENT DOCUMENTS

| | | | | |
|---|---|---|---|---|
| 6,005,636 A | * | 12/1999 | Westerman | G06F 3/04897 348/571 |
| 9,064,302 B2 | * | 6/2015 | Muraoka | G06K 9/3241 |
| 9,117,289 B2 | * | 8/2015 | Matsumoto | G06T 7/246 |

(Continued)

FOREIGN PATENT DOCUMENTS

| JP | 2005348001 A | * 12/2005 |
|---|---|---|
| JP | 2014064608 A | 4/2014 |

OTHER PUBLICATIONS

W. M. Hafizah, E. Supriyanto and J. Yunus, "Feature Extraction of Kidney Ultrasound Images Based on Intensity Histogram and Gray Level Co-occurrence Matrix," 2012 Sixth Asia Modelling Symposium, Bali, 2012, pp. 115-120, doi: 10.1109/AMS.2012.47. (Year: 2012).*

*Primary Examiner* — Vu Le
*Assistant Examiner* — Courtney Joan Nelson
(74) *Attorney, Agent, or Firm* — Lucas & Mercanti LLP (57) ABSTRACT

An image processing apparatus includes a hardware processor. The hardware processor calculates a characteristic amount from each frame images of a moving image. The characteristic amount indicates change in a subject. The moving image is obtained by radiographing a dynamic state of the subject. The hardware processor extracts a frame image having the characteristic amount satisfying a predetermined condition, processes the extracted frame image by applying an image processing parameter to the extracted frame image prior to a remaining frame image, and causes a display to display the processed frame image.

13 Claims, 8 Drawing Sheets

(56) References Cited

U.S. PATENT DOCUMENTS

| | | | |
|---|---|---|---|
| 2007/0055455 A1* | 3/2007 | Wei | G16H 30/40 |
| | | | 702/19 |
| 2015/0042677 A1* | 2/2015 | Shimamura | A61B 6/461 |
| | | | 345/632 |
| 2015/0077432 A1* | 3/2015 | Toyama | G06T 5/50 |
| | | | 345/600 |

* cited by examiner

IMAGE PROCESSING APPARATUS AND COMPUTER-READABLE STORAGE MEDIUM

BACKGROUND

1. Technological Field

The present disclosure relates to an image processing apparatus and a computer-readable storage medium.

2. Description of the Related Art

Conventionally, in the medical field, images obtained by radiographing subjects are processed, for example, gradation-processed, to be suitable for diagnosis.

For example, there is disclosed in JP 2014-64608 a technology of determining gradation process parameters on the basis of (i) a protocol including at least one of an imaging technique and an imaging site (part of the body) and (ii) a radiation condition, and performing a gradation process on image data on the basis of the determined gradation process parameters.

Users need to check whether or not the processed images, such as the gradation-processed images, are clinically suitable. However, in the case of moving images, it takes users much time to judge which frame image should be used to check whether or not a moving image is clinically acceptable. In addition, because which frame image should be used for the check is not specified, it is necessary to process all the frame images by applying image processing parameters thereto. This takes too much processing time and accordingly takes too much time to initially display a moving image for checking the image quality.

SUMMARY

Objects of the present disclosure include efficiently checking whether or not processed moving images are suitable for diagnosis.

In order to achieve at least one of the abovementioned objects, according to a first aspect of the present invention, there is provided an image processing apparatus including a hardware processor that:

calculates a characteristic amount indicating change in a subject from each of frame images of a moving image obtained by radiographing a dynamic state of the subject;

extracts a frame image having the characteristic amount satisfying a predetermined condition; and processes the extracted frame image by applying an image processing parameter to the extracted frame image prior to a remaining frame image, and causes a display to display the processed frame image.

According to a second aspect of the present invention, there is provided a non-transitory computer-readable storage medium storing a program to cause a computer to:

calculate a characteristic amount indicating change in a subject from each of frame images of a moving image obtained by radiographing a dynamic state of the subject;

extract a frame image having the characteristic amount satisfying a predetermined condition; and process the extracted frame image by applying an image processing parameter to the extracted frame image prior to a remaining frame image, and cause a display to display the processed frame image.

BRIEF DESCRIPTION OF THE DRAWINGS

The objects, advantages, and features provided by one or more embodiments of the present invention will become more fully understood from the detailed description given hereinbelow and the appended drawings that are given by way of illustration only, and thus are not intended as a definition of the limits of the present invention, wherein.

DETAILED DESCRIPTION OF EMBODIMENTS

Hereinafter, one or more embodiments of the present invention will be described with reference to the drawings. However, the scope of the present invention is not limited to the disclosed embodiments or the illustrated examples.

[Configuration of Image Processing Apparatus 1]

First, configuration of an image processing apparatus 1 according to an embodiment(s) of the present invention will be described.

The image processing apparatus 1 is an apparatus that processes moving images obtained by video (moving image) shooting of continuously emitting radiation to subjects, and provides the moving images for diagnosis. Images constituting each moving image are called frame images.

Figure 1:
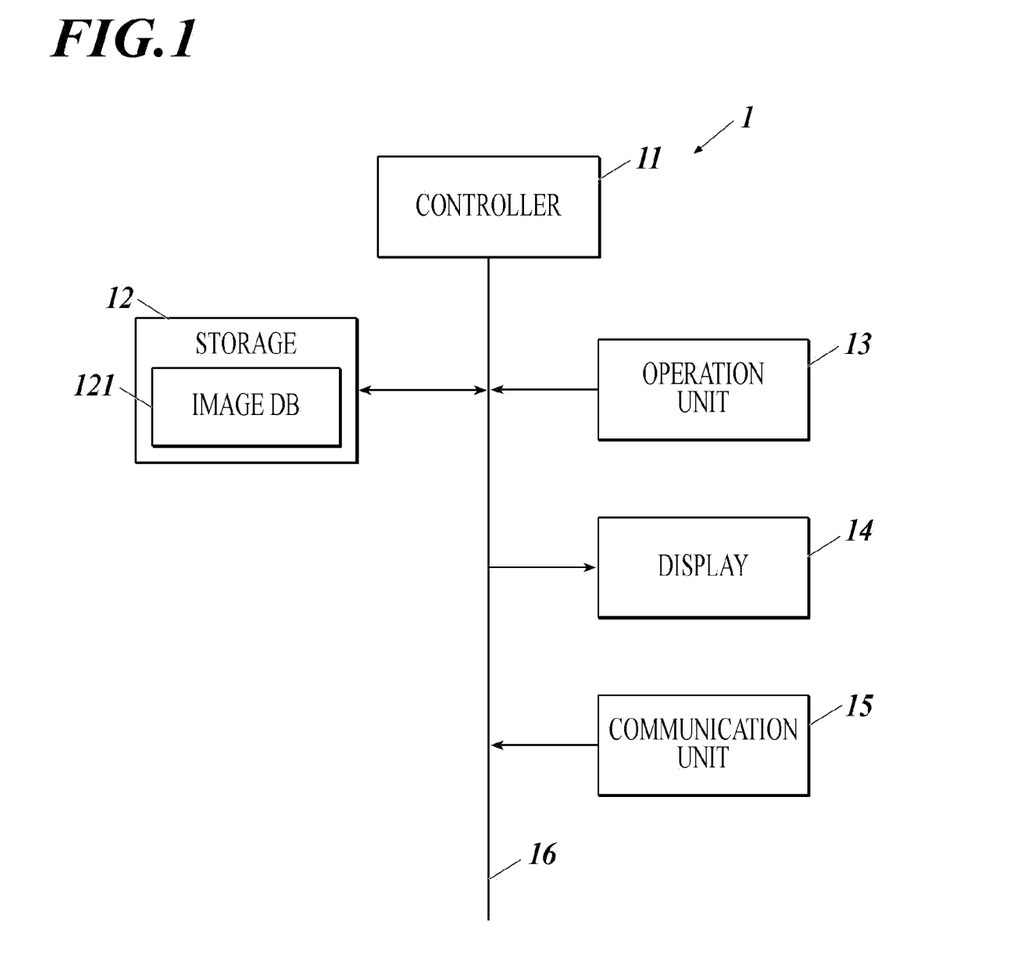
FIG. 1 is a block diagram showing functional configuration of an image processing apparatus according to an embodiment(s) of the present invention.

FIG. 1 is a block diagram showing functional configuration of the image processing apparatus 1. As shown in FIG. 1, the image processing apparatus 1 includes a controller 11 (hardware processor), a storage 12, an operation unit 13, a display 14, and a communication unit 15. These units or the like are connected to one another by a bus 16.

The controller 11 includes a CPU (Central Processing Unit) and a RAM (Random Access Memory). The CPU of the controller 11 reads a system program and various process programs stored in the storage 12 in response to operations on/with the operation unit 13, loads the read programs in the RAM, and performs concentrated control of operation of each unit or the like of the image processing apparatus 1 in accordance with the loaded programs.

The storage 12 is constituted of, for example, a nonvolatile semiconductor memory and/or a hard disk. The storage 12 stores the system program, the various programs, which are executed by the controller 11, data necessary to perform processes of the programs, such as parameters, and so forth. For example, the storage 12 stores a program for an image adjustment process described below. The various programs are stored in the form of a computer-readable program code(s), and the controller 11 operates in accordance with the program code.

The storage 12 has an image DB (DataBase) 121. The image DB 121 stores frame images of each moving image sent from a not-shown imaging apparatus associated with, for example, patient information (patient ID, patient name, height, weight, age, sex, etc. of the patient), examination information (examination ID, examination date, imaging site (part of the body), imaging direction (from the front or the side), technique, etc.), and image information (image ID, radiation emission condition, image reading condition, numbers indicating what number in the imaging order the respective frame images have been taken (frame numbers), etc.).

The operation unit 13 includes: a keyboard including cursor keys, number input keys, and various function keys; and a pointing device, such as a mouse, and outputs, to the controller 11, instruction signals input by user operations on the keys of the keyboard or with the mouse. The operation unit 13 may have a touchscreen on the display screen of the display 14. In this case, the operation unit 13 outputs, to the controller 11, instruction signals input via the touchscreen.

The display 14 is constituted of a monitor, such as an LCD (Liquid Crystal Display) or a CRT (Cathode Ray Tube), and displays instructions input from the operation unit 13, data, and so forth in accordance with instructions of display signals input from the controller 11.

The communication unit 15 includes a LAN adapter, a modem, and a TA (Terminal Adapter), and controls data exchange with not-shown external apparatuses, such as the imaging apparatus, connected to a communication network.
[Operation of Image Processing Apparatus 1]

Next, operation of the image processing apparatus 1 of this embodiment will be described.

When a moving image to be processed is selected, with the operation unit 13, from the moving images stored in the image DB 121, the abovementioned image adjustment process is performed by the controller 11 in cooperation with the program stored in the storage 12.

Hereinafter, the image adjustment process will be described with reference to FIG. 2.

First, the controller 11 calculates a characteristic amount indicating change in the subject from each frame image of the moving image, and extracts a frame image(s) having the characteristic amount satisfying a predetermined condition(s) as a frame image(s) to display for checking the image quality (hereinafter "display-for-check frame image") (Step S1).
[First Case of Moving Image of Chest]

For example, if the moving image to be processed is a moving image of the chest (hereinafter "chest image"), the controller 11 first, from each frame image, extracts lung field region(s), and calculates the average of signal values (hereinafter "average signal value") in the extracted lung field regions as the characteristic amount. Then, the controller 11 extracts a display-for-check frame image(s) on the basis of the calculated average signal values in the lung field regions of the respective frame images.

The lung field regions may be extracted by using any publicly known technique. For example, as disclosed in JP 2,987,633 B2, in an X-ray image, the lung field regions of the right and left lung parts have a higher image density as compared with their surroundings. Hence, the lung field regions may be extracted by creating a density histogram of an arbitrary frame image, determining image parts of high density regions, which correspond to the lung field regions, on the basis of the shape and the area of the density histogram, and identifying the image parts as the lung field regions in each frame image. Alternatively, the lung field regions may be extracted by using the technique disclosed in JP 2017-510427 A. Still alternatively, because, in general, a chest image is taken such that the lung fields are captured at the center part of the image (each frame image), the lung field regions may be extracted by setting a rectangular ROI (Region of Interest) having a predetermined size (ROI having a size of ½ of the image in vertical and horizontal directions) at the center part of the image, and calculating the average signal value in the ROI.

The signal values in the lung field regions change with breathing, and are large at inspiratory levels (increase during inspiration) and small at expiratory levels (decrease during expiration). Doctors lay stress on images at the maximum inspiratory level and the maximum expiratory level in making diagnosis by interpreting still images. The images at the maximum inspiratory level and the maximum expiratory level are images where a diagnostically characteristic symptom(s) appears (characteristic images). Hence, for example, calculating the average signal value in the lung field regions from each frame image and extracting a frame image having the average signal value being the maximum (frame image at the maximum inspiratory level) and a frame image having the average signal value being the minimum (frame image at the maximum expiratory level) can extract diagnostically important (characteristic) frame images. Further, extracting a frame image having the average signal value in the lung field regions being the average or the median among all the frame images can extract a representative frame image in breathing. Still further, because the signal values in the lung field regions in the top and the bottom several % of all the frame images could be outliers due to body motion or the like, and hence excluding the outliers and then extracting a frame image having the average signal value being the maximum, the minimum, the average, or the median can extract a target frame image with higher accuracy.
[Second Case of Moving Image of Chest]

If the moving image to be processed is a chest image, the controller 11 may, from each frame image, extract the lung field regions and calculate a texture characteristic amount in the extracted lung field regions, such as an integrated value of the power spectrum in a specific frequency band (e.g. a frequency band higher than a predetermined threshold value) in the lung field regions, as the characteristic amount, and extract a display-for-check frame image(s) on the basis of the calculated characteristic amount of each frame image.

Figure 3:
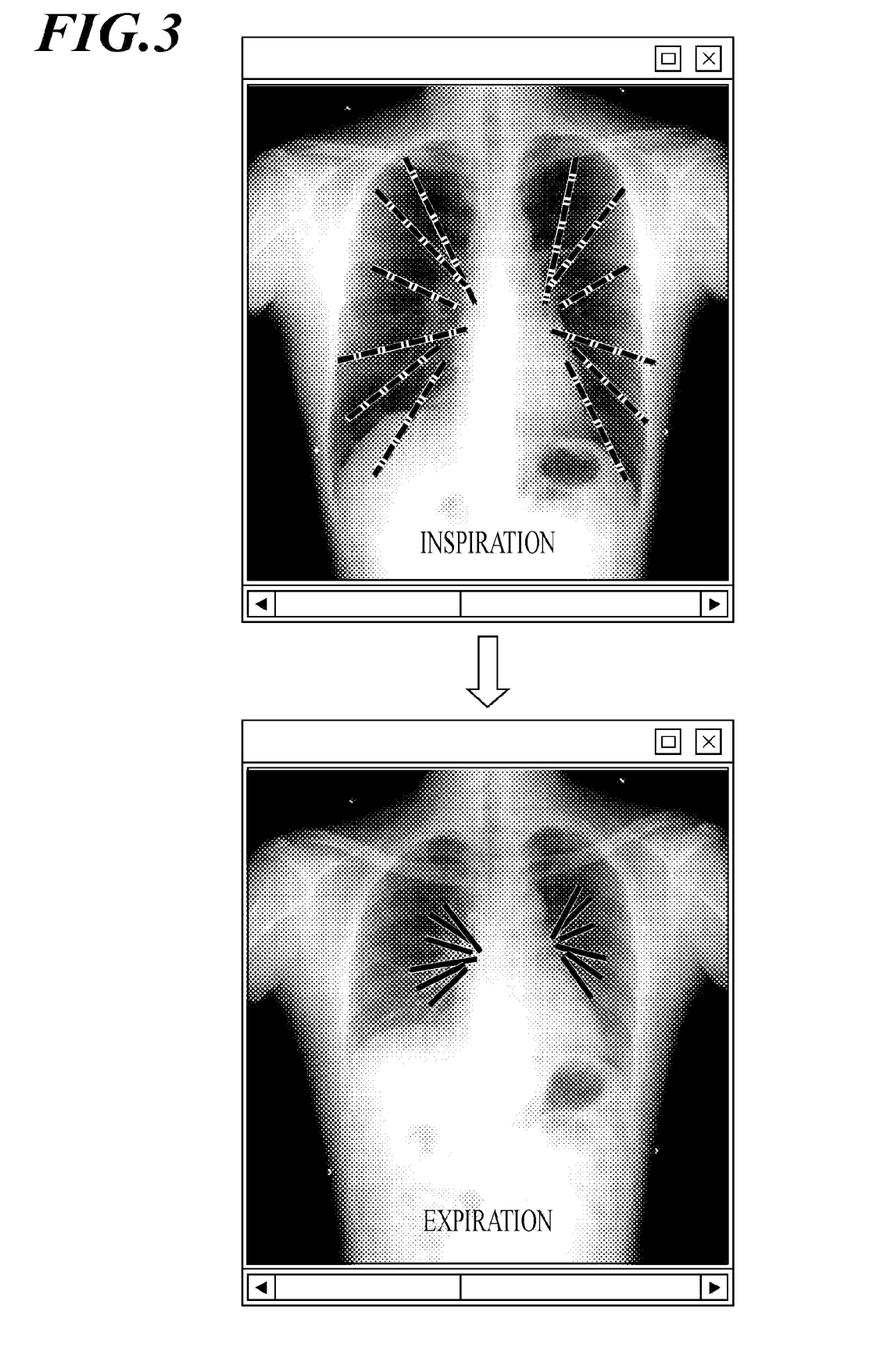
FIG. 3 schematically shows change in lung blood vessels in a shift from an inspiratory level to an expiratory level.
Figure 4:
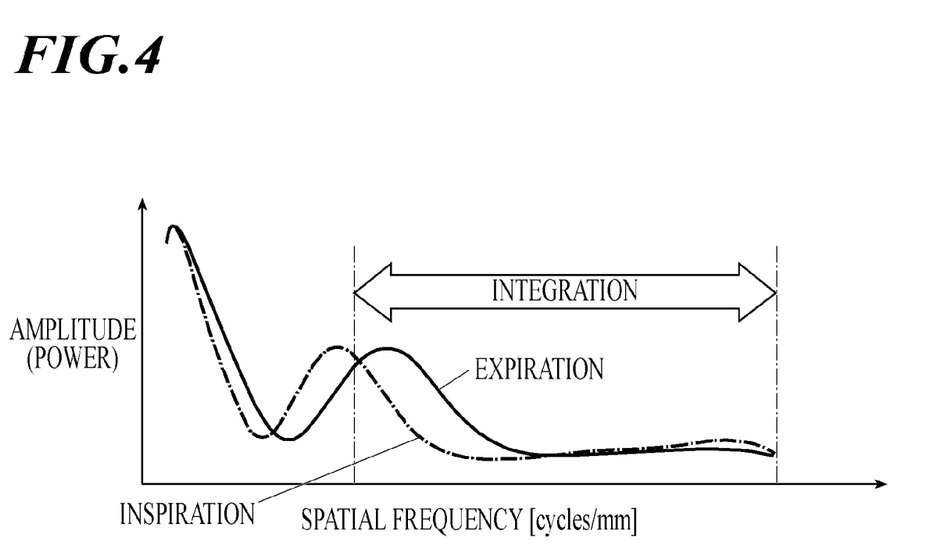
FIG. 4 is a graph showing change in spatial frequency in lung field regions of a chest image at inspiratory levels (during inspiration) and expiratory levels (during expiration)

For example, the controller 11 performs FFT (Fast Fourier Transform) in the extracted lung field regions and calculates a spatial frequency component included in the lung field regions, and integrates the power spectrum in a specific frequency band of blood vessels in the lung field regions. As schematically shown in FIG. 3, the lung blood vessels, which spread in the lung fields, gather around the lung hila in a shift from an inspiratory level to an expiratory level, and hence, as shown in FIG. 4, the peak of the power spectrum moves from a low-frequency side to a high-frequency side of the spatial frequency. For example, extracting a frame image having the integrated value of the power spectrum in a specific frequency band being the minimum (frame image at the maximum inspiratory level) and a frame image having the integrated value thereof being the maximum (frame image at the maximum expiratory level) by making use of the above characteristics can extract diagnostically important (characteristic) frame images as display-for-check frame images.

In the above case where the average signal value (density) in the lung field regions of each frame image is used as the characteristic amount, the density may change owing to movement of structures outside the lung field regions, such as breasts. Meanwhile, catching change in a specific frequency band (high frequency components in particular) in the lung field regions can catch change with breathing without being affected by structures outside the lung field regions.

[Third Case of Moving Image of Chest]

If the moving image to be processed is a chest image, the controller 11 may, from each frame image, extract the edge of the diaphragm (an example of a structure in the lung field regions) and calculate the position of the extracted edge of the diaphragm as the characteristic amount, and extract a display-for-check frame image(s) on the basis of the calculated characteristic amount of each frame image. The position of the edge of the diaphragm changes with breathing, and is low at inspiratory levels (decreases during inspiration) and high at expiratory levels (increases during expiration).

For example, the controller 11 first extracts the edge of the diaphragm from one frame image. Because the contours of the bases of the lung fields are the boundary with the diaphragm, extracting the edge of the diaphragm can extract the contours of the bases of the lung fields. Next, the controller 11 sets a reference point on the extracted edge of the diaphragm, and extracts the reference point in the other frame images by template matching by using, as a template image, a predetermined-sized region having the set reference point as the center. Then, the controller 11 extracts a frame image having the reference point at the highest coordinate in the body axis direction (frame image at the maximum expiratory level) and a frame image having the reference point at the lowest coordinate in the body axis direction (frame image at the maximum inspiratory level) as display-for-check frame images. This can catch change with breathing without being affected by, for example, density change due to movement of structures outside the lung field regions, as with the case where the characteristic amount is the texture characteristic amount.

The movement amount (speed) of the diaphragm between adjacent frame images may also be used as the characteristic amount. For example, extracting a frame image showing that the diaphragm has moved most (having the movement amount from its adjacent frame image being the maximum) and displaying this frame image together with the frame images at the maximum inspiratory level and the maximum expiratory level as display-for-check frame images can realize the image quality check with movement of the diaphragm taken into account.

Other than the above, for example, the change amount of the average signal values (signal value change amount) in the lung field regions (difference value between the average signal value of each frame image and the average signal value of a reference frame image (e.g. the frame image at the maximum expiratory level)), the distance(s) between the lung apexes and the diaphragm (indicating the position of the diaphragm), and the area(s) (size(s)) of the lung field regions may also be used as the characteristic amount.

[Case of Moving Image of Joint]

Figure 5:
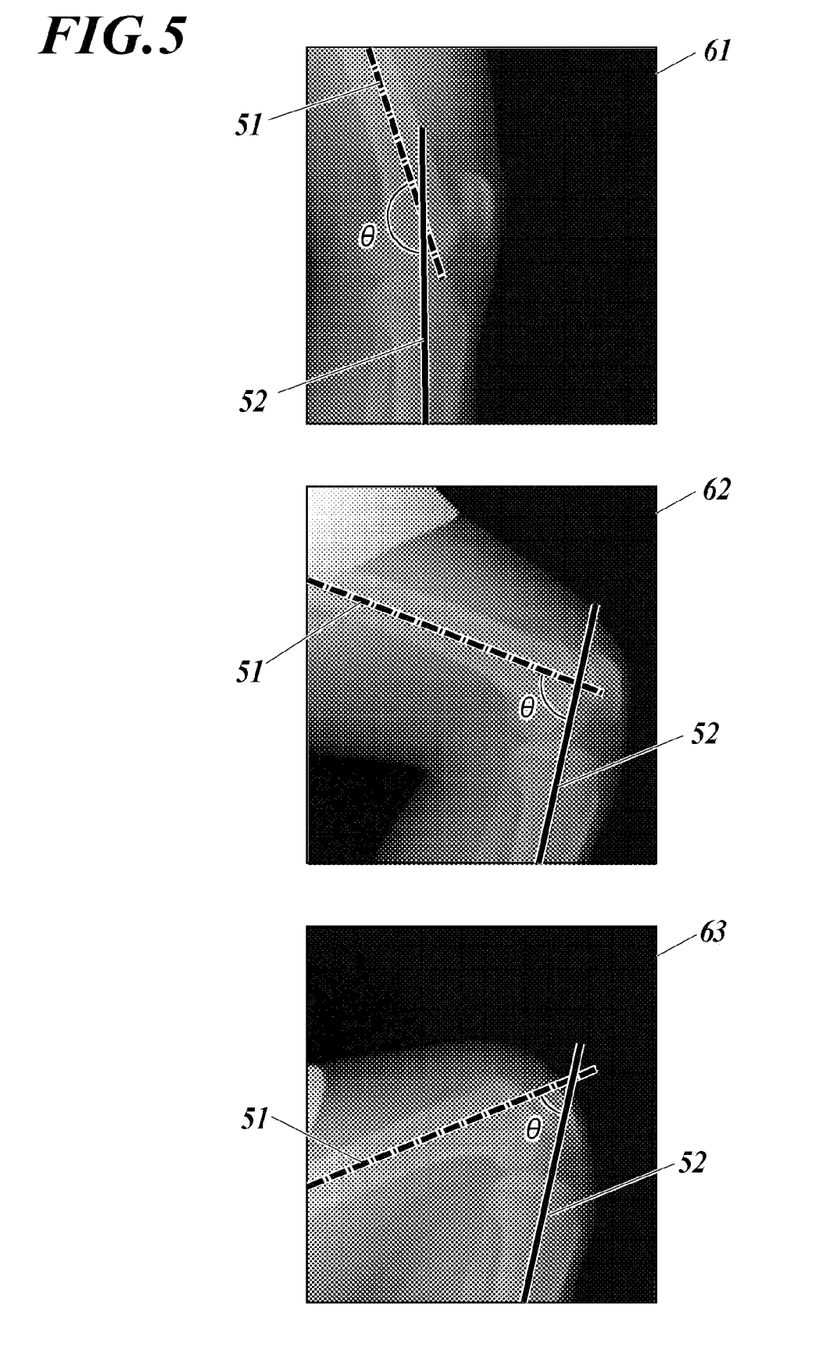
FIG. 5 shows images to explain a characteristic amount of a joint image.

If the moving image to be processed is a moving image of a joint (hereinafter "joint image"), using the characteristic amount indicating, for example, a range of motion or a space in a joint can extract diagnostically important (characteristic) frame images, as with the case where the moving image to be processed is a chest image. For example, the controller 11 extracts a region of bones (bone region) with a classifier, such as CNN (Convolutional Neural Network), which has learned bone regions, and as shown in FIG. 5, obtains main axes (51 and 52 in FIG. 5) in the bone region, and calculates an intersection angle θ of the main axes of the bones (joint motion amount) as the characteristic amount. Then, the controller 11 extracts a frame image 63 having the intersection angle θ being the minimum (bending) and a frame image 61 having the intersection angle θ being the maximum (stretching) as display-for-check frame images. This can extract frame images showing low impact and high impact on a joint, namely diagnostically important (characteristic) frame images.

[Case of Moving Image of Swallowing Examination]

Figure 6A:
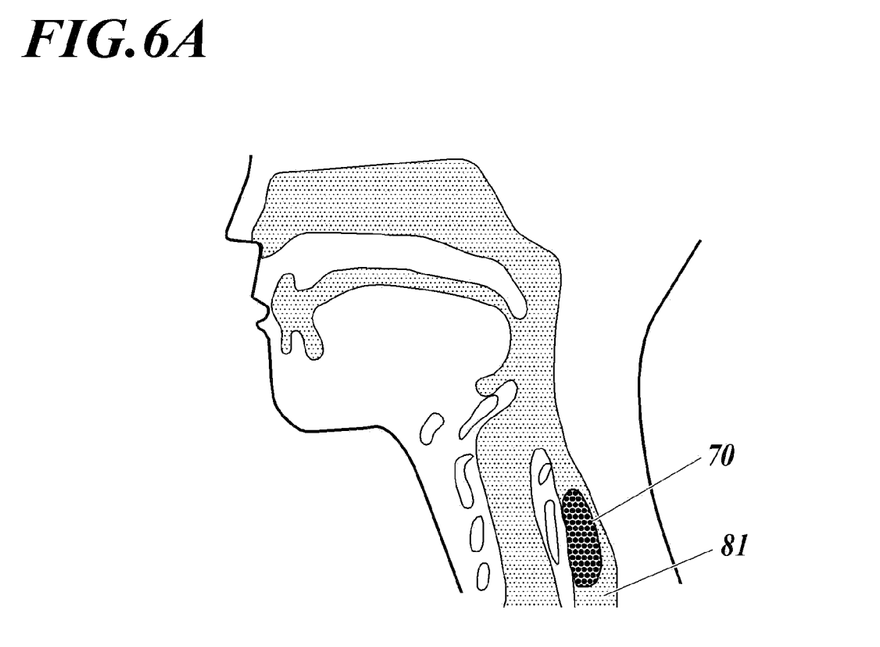
FIG. 6A schematically shows a proper swallowing action.
Figure 6B:
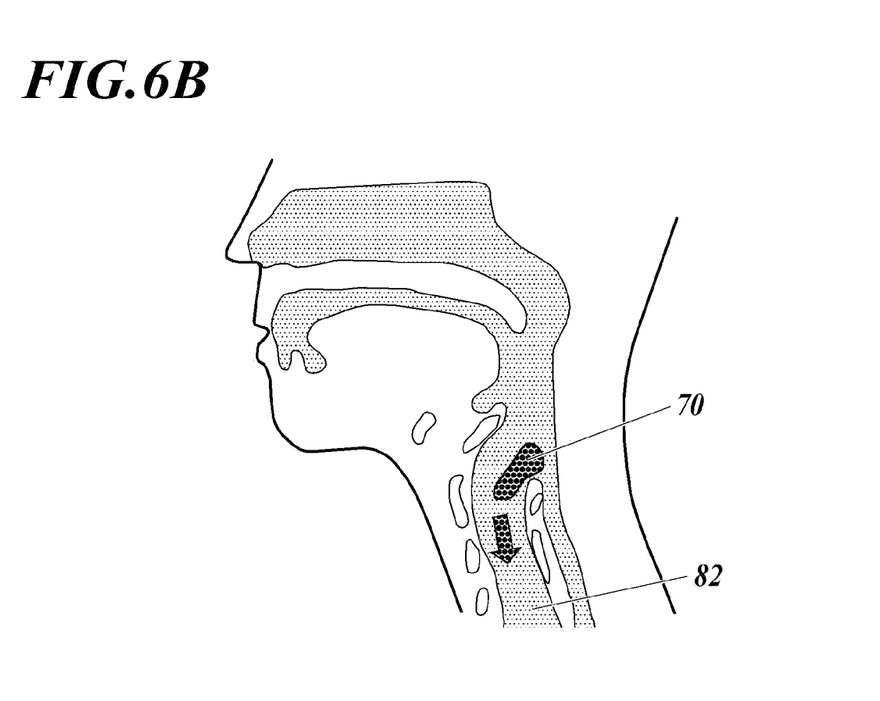
FIG. 6B schematically shows an improper swallowing action.

In a swallowing examination (examination in which a contrast medium-containing diet for examination is swallowed), if a diet for examination 70 is swallowed properly, as shown in FIG. 6A, the diet for examination 70 is delivered into the esophagus 81, but if the ability to swallow is low or the diet for examination 70 is swallowed improperly, as shown in FIG. 6B, the diet for examination 70 enters the trachea 82.

Figure 7:
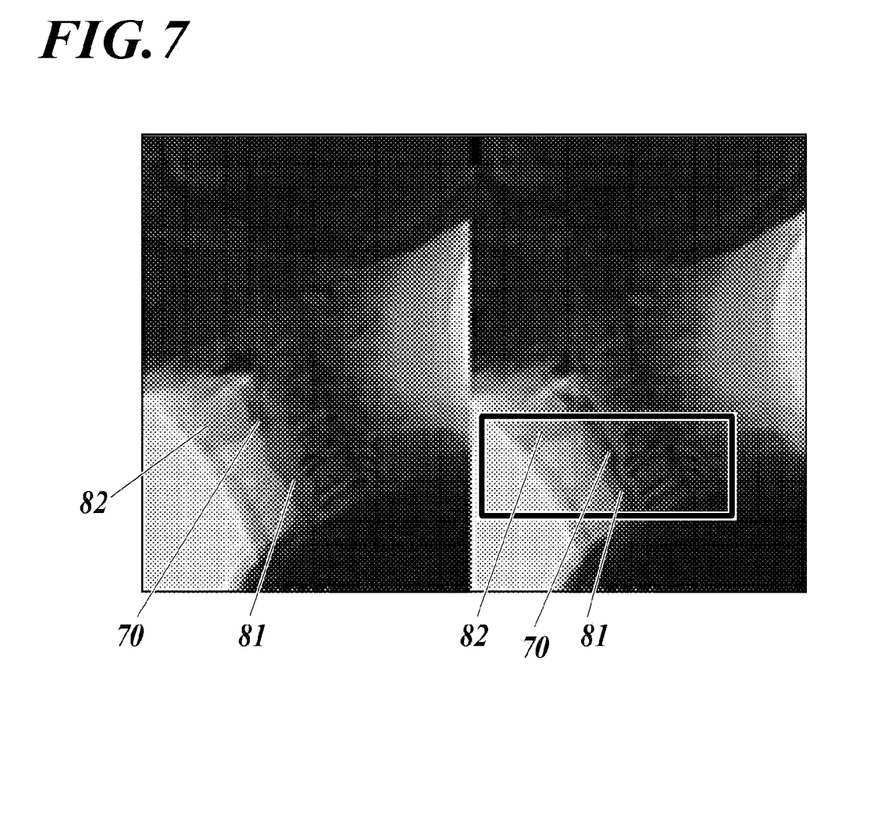
FIG. 7 shows an example of a swallowing image.
Figure 8:
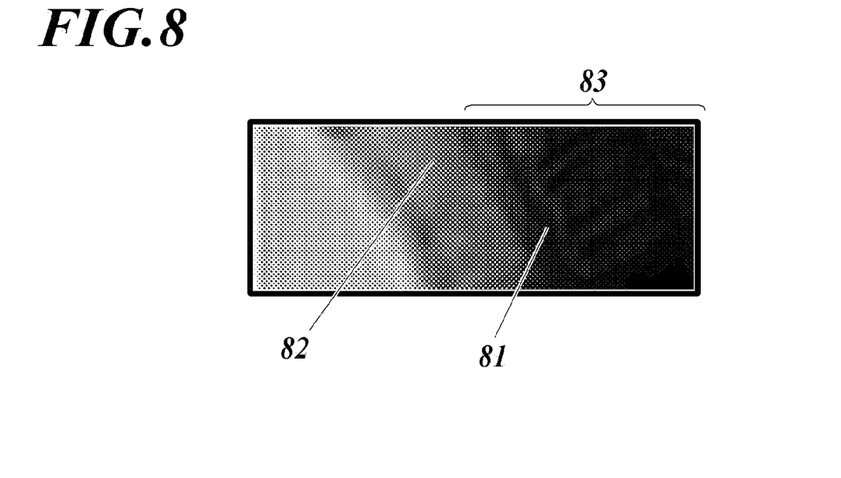
FIG. 8 shows an example of a template image of a region of interest of the swallowing image.

FIG. 7 shows an example of a moving image of a swallowing examination (hereinafter "swallowing image"). The left part in FIG. 7 shows a frame image showing that the diet for examination 70 is about to enter the esophagus 81, and the right part in FIG. 7 shows a frame image showing that the diet for examination 70 has been delivered into the esophagus 81. In a swallowing image(s), the diet for examination 70 is drawn in black (with high density) as shown in FIG. 7. The controller 11, for example, first stores a template image in which the trachea 82 and the esophagus 81 are captured as shown in FIG. 8 (e.g. an image of a rectangular region indicated by a thick line in FIG. 7) in the storage 12 beforehand, scans each frame image for the template image and calculates a correlation value with the template image, and recognizes a region having the highest correlation value as an ROI in which the trachea 82 and the esophagus 81 are captured. Next, the controller 11 calculates the average signal value in the trachea region 82 and the average signal value in a region 83 including the esophagus region 81 in the ROI of each frame image, and calculates the signal value change amount in the trachea region 82 with its adjacent frame image (difference value between the average signal values, indicating the moving speed of the diet for examination 70) and the signal value change amount in the region 83 including the esophagus region 81 with the adjacent frame image (difference value between the average signal values, indicating the moving speed of the diet for examination 70) as the characteristic amount. Then, the controller 11 extracts a frame image having the signal value change amount in the region 83 including the esophagus region 81 exceeding a reference value (frame image at the timing when the diet for examination 70 flows into the esophagus) and/or a frame image having the signal value change amount in the trachea region 82 exceeding a/the reference value (frame image at the timing when the diet for examination 70 flows into the trachea) as a display-for-check frame image(s). This can extract a frame image(s) at the timing when the diet for examination 70 flows into the esophagus and/or the trachea, namely a diagnostically important (characteristic) frame image(s).

Next, the controller 11 processes (performs image processing on) the display-for-check frame image by applying an image processing parameter(s) thereto (Step S2).

In Step S2, the controller 11 performs image processing on the display-for-check frame image first, the image processing being performed on all the frame images of the moving image in the end Image processing that is performed on all the frame images of the moving image and an image processing parameter(s) that is applied thereto are not particularly limited. Examples of image processing include the abovementioned gradation process and a frequency emphasis process. Examples of image processing parameters for the gradation process include a window level (WL) and a window width (WW). Examples of image processing parameters for the frequency emphasis process include an emphasis coefficient.

The controller 11 determines the image processing parameter on the basis of, for example, the imaging site, the technique (e.g. whether or not a contrast medium has been used), the radiation emission condition, and the height and the weight of the patient (examinee), and applies the determined image processing parameter to the display-for-check frame image, thereby processing the display-for-check frame image. Alternatively, the controller 11 may determine the image processing parameter by analyzing the display-for-check frame image (or the display-for-check frame image and the preceding and/or following frame image(s)). For example, the controller 11 may set an ROI in the display-for-check frame image (or the display-for-check frame image and the preceding and/or following frame image(s)), and determine the image processing parameter on the basis of signal values in the ROI. The determined image processing parameter is stored in the RAM of the controller 11.

Next, the controller 11 causes the display 14 to display a check screen 141 where the processed display-for-check frame image is displayed (Step S3).

Figure 9:
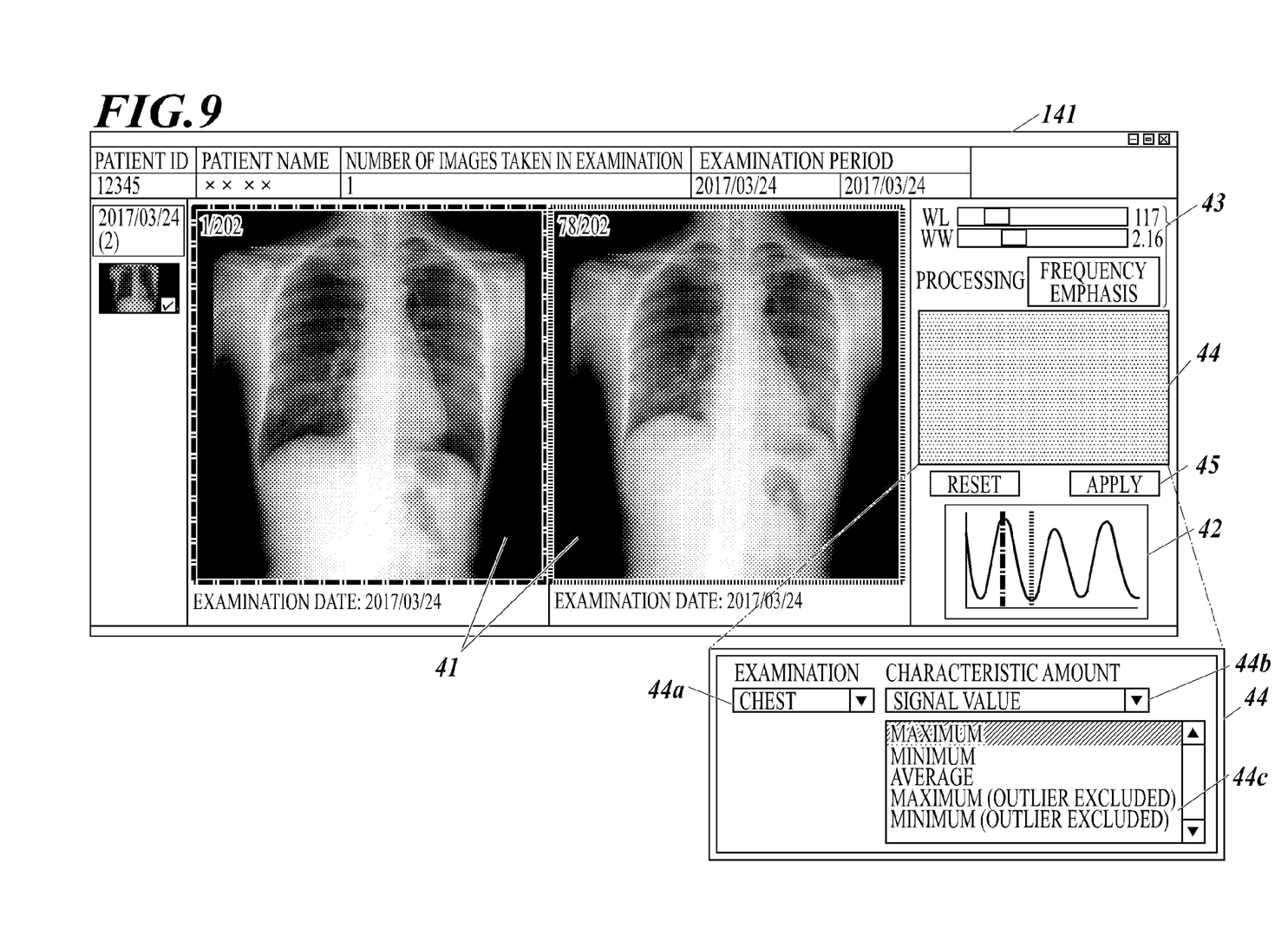
FIG. 9 shows an example of a check screen.

FIG. 9 shows an example of the check screen 141. As shown in FIG. 9, the check screen 141 includes an image display region 41, a frame information display region 42, a parameter adjustment tool 43, a characteristic amount change/input field 44, and an apply button 45.

In the image display region 41, display-for-check frame images are displayed.

In the frame information display region 42, (i) a graph showing temporal change of values of the characteristic amount of respective frame images of a moving image and (ii) information on positions of the display-for-check frame images in the graph (information indicating that the characteristic amount in what state each frame image displayed as a display-for-check frame image has) are displayed.

The parameter adjustment tool 43 includes, for example, sliding bars and/or buttons for the user to adjust image processing parameters. The characteristic amount change/input field 44 is a tool that is used by the user when, for example, the user desires to change a display-for-check frame image by changing the characteristic amount for extracting a display-for-check frame image(s) to input a type of characteristic amount and a condition of the characteristic amount for extracting a frame image as a display-for-check frame image.

The characteristic amount change/input field 44 includes an examination (imaging site) selection field 44a, a characteristic amount selection field 44b, and a condition selection field 44c for selecting a condition of the characteristic amount, the condition being used for extracting a display-for-check frame image. When an examination or the like is selected in the examination (imaging site) selection field 44a, types of characteristic amount calculable from a moving image of the selected examination (imaging site) are displayed as a pull-down menu in the characteristic amount selection field 44b, and when a type of characteristic amount is selected from the pull-down menu, conditions of the characteristic amount used for extracting display-for-check frame images are displayed as a list in the condition selection field 44c, and a condition selected from the list is set as a frame image extraction condition.

The apply button 45 is a button for making an instruction to apply an image processing parameter(s) applied to a display-for-check frame image(s) to all the (or all the other) frame images.

In this embodiment, among frame images of a moving image, a display-for-check frame image (a), which is a diagnostically important (characteristic) frame image(s), is processed and then displayed by the display 14 prior to the other frame images. Hence, the user does not need to judge which frame image should be used to check whether or not a processed moving image is suitable for diagnosis, and hence can efficiently check the image quality. Further, not all frame images need to be processed for checking the image quality of a moving image. This can promptly display a display-for-check frame image(s), and reduce waiting time for the user to check the image quality.

Further, the check screen 141 is provided with the user interface for the user to adjust image processing parameters and change display-for-check frame images. Hence, the user can easily adjust image processing parameters and change display-for-check frame images.

Next, the controller 11 determines whether or not a change instruction to change the characteristic amount has been input from the characteristic amount change/input field 44 with the operation unit 13 (Step S4).

If the controller 11 determines that a change instruction to change the characteristic amount has been input (Step S4; YES), the controller 11 returns to Step S1, and performs Steps S1 to S4 with the newly set characteristic amount.

If the controller 11 determines that no change instruction to change the characteristic amount has been input (Step S4; NO), the controller 11 determines whether or not the image processing parameter has been adjusted by operating the parameter adjustment tool 43 with the operation unit 13 (Step S5).

If the controller 11 determines that the image processing parameter has been adjusted (Step S5; YES), the controller 11 stores the adjusted image processing parameter in the RAM and returns to Step S2, and performs Steps S2 to S5 with the adjusted image processing parameter.

If the controller 11 determines that the image processing parameter has not been adjusted (Step S5; NO), the controller 11 determines whether or not the apply button 45 has been pressed (Step S6).

If the controller 11 determines that the apply button 45 has not been pressed (Step S6; NO), the controller 11 returns to Step S4.

If the controller 11 determines that the apply button 45 has been pressed (Step S6; YES), the controller 11 processes all the frame images of the moving image by applying the image processing parameter stored in the RAM to the frame images (Step S7), and ends the image adjustment process.

The processed frame images of the moving image are stored in the image DB 121, and displayed or analyzed in response to operations on/with the operation unit 13.

Figure 2:
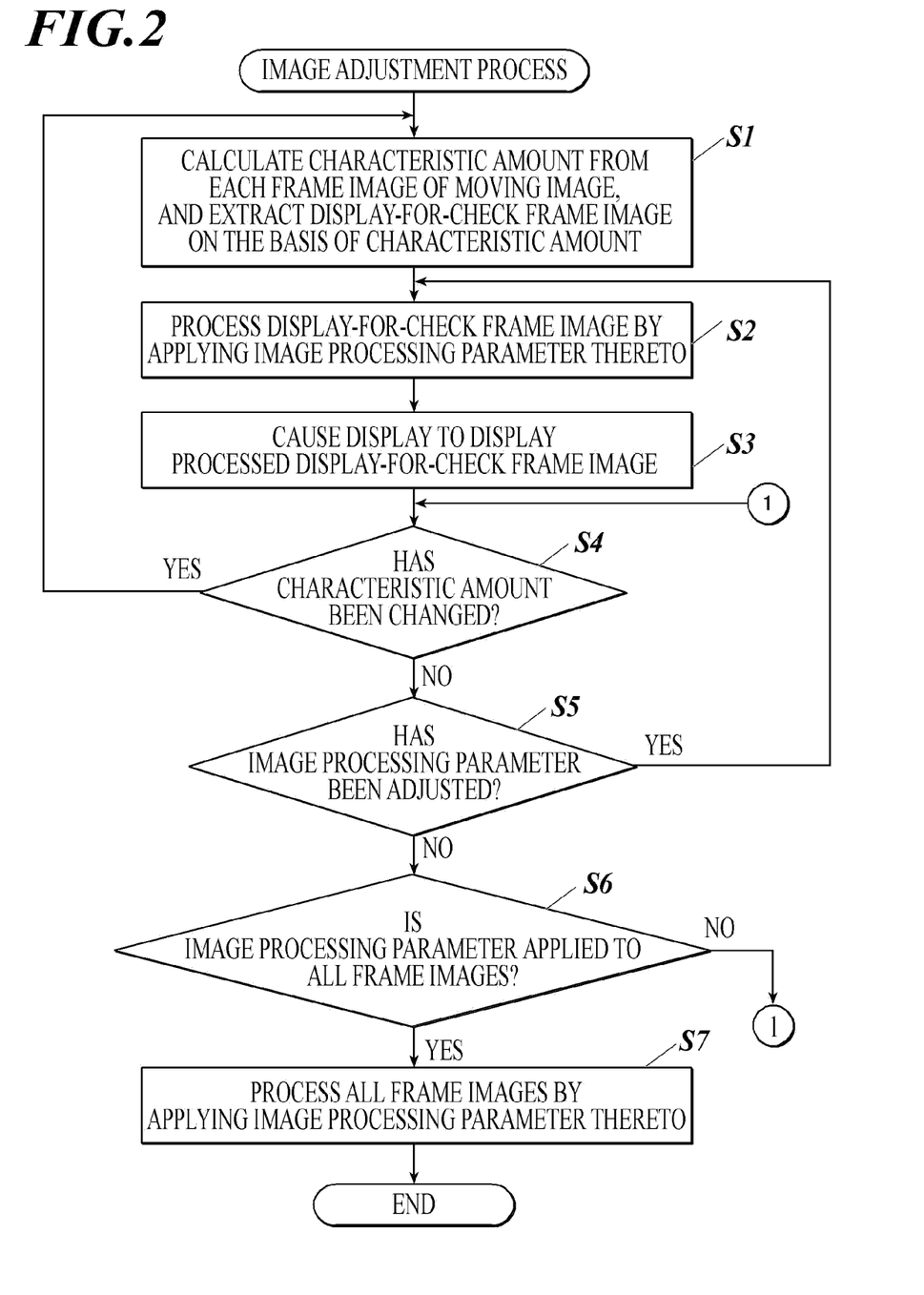
FIG. 2 is a flowchart showing an image adjustment process that is performed by a controller shown in FIG. 1.

In the image adjustment process shown in FIG. 2, prior to the other frame images, only the display-for-check frame image extracted in Step S1 is processed by applying an image processing parameter(s) thereto. Alternatively, after the display-for-check frame image is processed and displayed (or at the same time as the display-for-check frame image is displayed), a frame image(s) preceding and/or following the display-for-check frame image may also be processed by applying the same image processing parameter(s) thereto. In this case, for example, an arrow button or the like may be provided near the image display region 41 to switch the frame image displayed in the image display region 41 to another processed frame image in response to an operation on the arrow button. This allows the user to check whether or not the image processing parameter is proper with the frame image(s) preceding and/or following the display-for-check frame image too. Still alternatively, after the display-for-check frame image is processed and displayed (or at the same time as the display-for-check frame image is displayed), all the other frame images may be processed consecutively by applying the same image processing parameter(s) thereto. This can reduce waiting time for the moving image to be displayed.

The image processing apparatus 1 may be configured such that the user can set an ROI in the display-for-check frame image displayed in the image display region 41 with the operation unit 13, and when the user sets the ROI, the controller 11 recalculates the image processing parameter on the basis of signal values in the set ROI, and processes the display-for-check frame image by applying the recalculated image processing parameter thereto.

As described above, according to the image processing apparatus 1, the controller 11 calculates a characteristic amount indicating change in a subject from each of frame images of a moving image obtained by radiographing a dynamic state of the subject; extracts a frame image(s) having the characteristic amount satisfying a predetermined condition(s) as a display-for-check frame image(s); and processes the extracted display-for-check frame image by applying an image processing parameter to the extracted display-for-check frame image prior to the other (remaining) frame image(s), and causes the display 14 to display the processed frame image.

Thus, among frame images of a moving image, a display-for-check frame image(s) is processed and then displayed by the display 14 prior to the other frame images. Hence, the user does not need to judge which frame image should be used to check whether or not a processed moving image is suitable for diagnosis, and hence can efficiently check the image quality. Further, not all frame images need to be processed for checking the image quality of a moving image. This can promptly display a display-for-check frame image(s), and reduce waiting time for the user to check the image quality.

For example, if the moving image is a chest image, the controller 11 uses (selects), as the characteristic amount, any of (i) the signal value (average signal value) in a predetermined region of the subject, (ii) the signal value change amount in the predetermined region, (iii) the texture characteristic amount in the predetermined region, (iv) the size of the predetermined region, (v) the movement amount of a predetermined structure in the predetermined region, and (vi) the position of the predetermined structure in the predetermined region, and extracts at least the frame image having the characteristic amount being the maximum and the frame image having the characteristic amount being the minimum as display-for-check frame images. Hence, the user can efficiently check whether or not diagnostically important (characteristic) frame images have been processed to be suitable for diagnosis.

As an another example, if the moving image is a joint image, the controller 11 uses (selects), as the characteristic amount, the movement amount of a joint in a predetermined region of the subject, and extracts at least the frame image having the characteristic amount being the maximum and the frame image having the characteristic amount being the minimum as display-for-check frame images. Hence, the user can efficiently check whether or not diagnostically important (characteristic) frame images have been processed to be suitable for diagnosis.

As an another example, if the moving image is a swallowing image, the controller 11 uses (selects), as the characteristic amount, the signal value change amount in a predetermined region (e.g. the region including the trachea region and the esophagus region) of the subject, and extracts at least the frame image(s) having the characteristic amount exceeding a predetermined threshold value as a display-for-check frame image(s). Hence, the user can efficiently check whether or not a diagnostically important (characteristic) frame image(s) has been processed to be suitable for diagnosis.

Further, the controller 11 causes the display 14 to display, for example, information indicating change in the characteristic amount calculated from each of the frame images and information on the characteristic amount calculated from the extracted frame image(s). Hence, the user can easily understand that the characteristic amount in what state each frame image displayed as a display-for-check frame image has.

Further, the image processing apparatus 1 includes the user interface with which a user adjusts the image processing parameter applied to the frame image displayed by the display 14. Hence, if the user judges that the displayed frame image has not been processed to be suitable for diagnosis, he/she can immediately adjust the image processing parameter.

Further, the image processing apparatus 1 includes the user interface with which a user changes (i) the type of the characteristic amount, which is calculated from each of the frame images for extracting a display-for-check frame image(s), and (ii) the condition, which the characteristic amount of a frame image satisfies so that the frame image is extracted. Hence, the user can change the characteristic amount used for extracting a display-for-check frame image(s).

Those described in the above embodiment are preferred examples of the present invention, and hence not intended to limit the present invention.

For example, although in the above description, a hard disk and a nonvolatile semiconductor memory are disclosed as examples of a computer-readable storage medium storing the program(s) disclosed herein, the computer-readable storage medium is not limited to these. As the computer-readable storage medium, a portable storage medium, such as a CD-ROM, may also be used. Also, as a medium that provides, via a communication line, data of the program(s) disclosed herein, a carrier wave may be used.

The detailed configuration and detailed operation of each unit or the like of the image processing apparatus can also be appropriately modified without departing from the scope of the present invention.

Although some embodiments of the present invention have been described and illustrated in detail, the disclosed embodiments are made for purposes of not limitation but illustration and example only. The scope of the present invention should be interpreted by terms of the appended claims.

The entire disclosure of Japanese Patent Application No. 2018-215181 filed Nov. 16, 2018 is incorporated herein by reference in its entirety.

What is claimed is:

1. An image processing apparatus comprising a hardware processor that:

calculates a characteristic amount indicating change in a subject from each of frame images of a moving image obtained by radiographing a dynamic state of the subject, the frame images of the moving image being a sequence of images showing a movement of the subject;

extracts one or more display-to-check frame images(s) from the frame images of the moving image having the characteristic amount satisfying a predetermined condition, the display-to-check frame image(s) being a subset of the frame images of the moving image; and processes the display-to-check frame image(s) by applying an image processing parameter to the display-to-check frame image(s), and causes a display to display the processed display-to-check frame image(s) for checking image quality before the image processing parameter is applied to remaining frame images of the frame images of the moving image.

2. The image processing apparatus according to claim 1, wherein the one or more display-to-check frame image(s) extracted by the hardware processor have the characteristic amount being maximum and the characteristic amount being minimum.

3. The image processing apparatus according to claim 1, wherein the characteristic amount is any of (i) a signal value in a predetermined region of the subject, (ii) a signal value change amount in the predetermined region, (iii) a texture characteristic amount in the predetermined region, (iv) a size of the predetermined region, (v) a movement amount of a predetermined structure in the predetermined region, and (vi) a position of the predetermined structure in the predetermined region.

4. The image processing apparatus according to claim 1, wherein the moving image is a chest image or a joint image.

5. The image processing apparatus according to claim 1, wherein the one or more display-to-check frame image(s) extracted by the hardware processor have the characteristic amount exceeding a predetermined threshold value.

6. The image processing apparatus according to claim 1, wherein the characteristic amount is a signal value change amount in a predetermined region of the subject.

7. The image processing apparatus according to claim 1, wherein the moving image is a swallowing image.

8. The image processing apparatus according to claim 1, wherein the hardware processor causes the display to display information indicating change in the characteristic amount calculated from each of the frame images and information on the characteristic amount calculated from the display-to-check frame image(s).

9. The image processing apparatus according to claim 1, comprising a user interface with which a user adjusts the image processing parameter applied to the display-to-check frame image(s) displayed by the display.

10. The image processing apparatus according to claim 1, comprising a user interface with which a user changes (i) a type of the characteristic amount and (ii) the condition of the characteristic amount.

11. The image processing apparatus according to claim 1, wherein the image processing parameter is applied to the remaining frame images in response to a user input after the processed frame image is displayed.

12. The image processing apparatus according to claim 1, wherein the hardware processor provides a user interface on the display with which a user inputs an instruction to apply the image processing parameter to the remaining frame images.

13. A non-transitory computer-readable storage medium storing a program to cause a computer to:

calculate a characteristic amount indicating change in a subject from each of frame images of a moving image obtained by radiographing a dynamic state of the subject, the frame images of the moving image being a sequence of images showing a movement of the subject;

extract one or more display-to-check frame images(s) from the frame images of the moving image having the characteristic amount satisfying a predetermined condition, the display-to-check frame image(s) being a subset of the frame images of the moving image; and process the display-to-check frame image(s) by applying an image processing parameter to the display-to-check frame image(s), and cause a display to display the processed display-to-check frame image(s) for checking image quality before the image processing parameter is applied to remaining frame images of the frame images of the moving image.

* * * * *